United States Patent [19]

Blunier et al.

[11] 4,105,260
[45] Aug. 8, 1978

[54] TRACK SHOE AND BOLT RETENTION ARRANGEMENT

[75] Inventors: Dennis L. Blunier, Danvers; Donald E. Clemens, Tremont, both of Ill.

[73] Assignee: Caterpillar Tractor Co., Peoria, Ill.

[21] Appl. No.: 753,602

[22] Filed: Dec. 22, 1976

Related U.S. Application Data

[63] Continuation of Ser. No. 601,869, Aug. 4, 1975, abandoned.

[51] Int. Cl.$^2$ ............................................. B62D 55/28
[52] U.S. Cl. ................................................... 305/54
[58] Field of Search ............................ 305/54, 55, 58; 403/408, 405, 379; 52/758 F

[56] References Cited

U.S. PATENT DOCUMENTS

| | | | |
|---|---|---|---|
| 2,560,413 | 7/1951 | Carlson | 403/405 X |
| 2,823,080 | 2/1958 | Bauer | 305/54 |
| 2,832,246 | 4/1958 | Livermont | 403/379 X |
| 3,258,283 | 6/1966 | Winberg et al. | 403/379 |
| 3,822,923 | 7/1974 | Stedman | 305/58 |

*Primary Examiner*—Robert B. Reeves
*Assistant Examiner*—John P. Shannon
*Attorney, Agent, or Firm*—Wegner, Stellman, McCord, Wiles & Wood

[57] ABSTRACT

In the track of a track-type vehicle, the track shoes are bolted and keyed to the track line to substantially reduce or eliminate shear and bending stresses on the bolts. The elimination or reduction of movement resulting in shear on the bolts between the track shoe and the master link is of particular importance.

12 Claims, 8 Drawing Figures

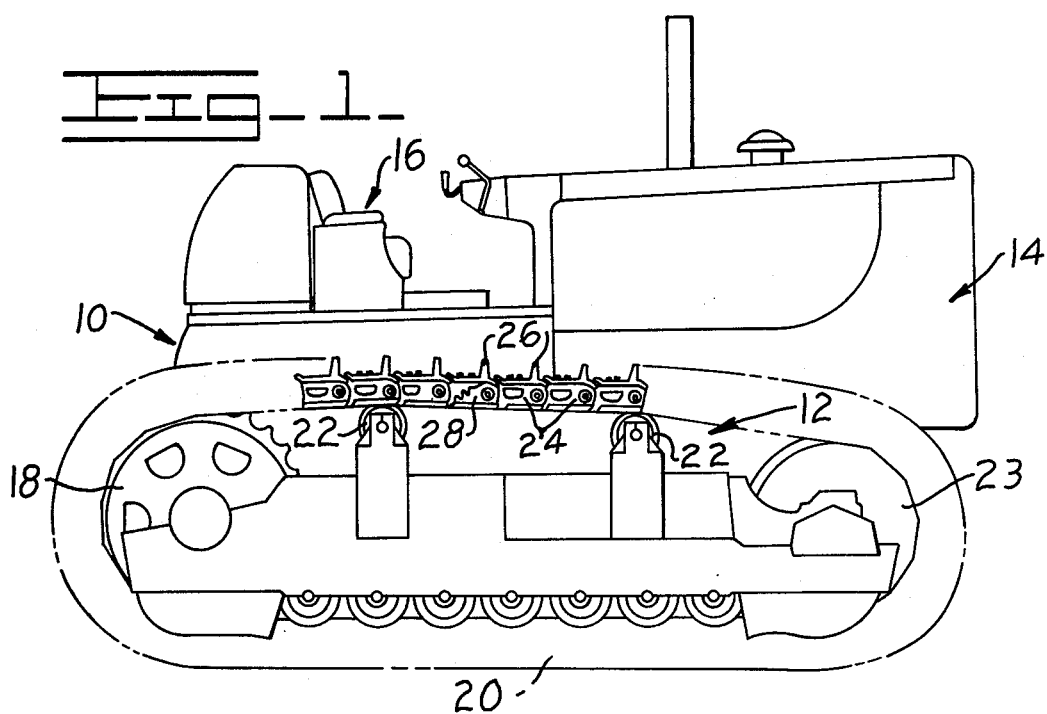
Fig_1_
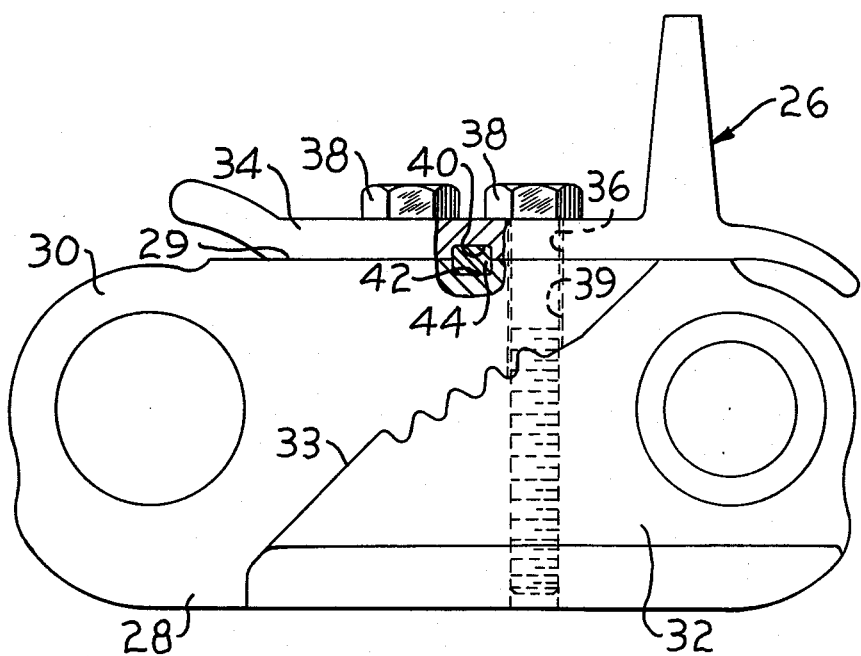
Fig_2_

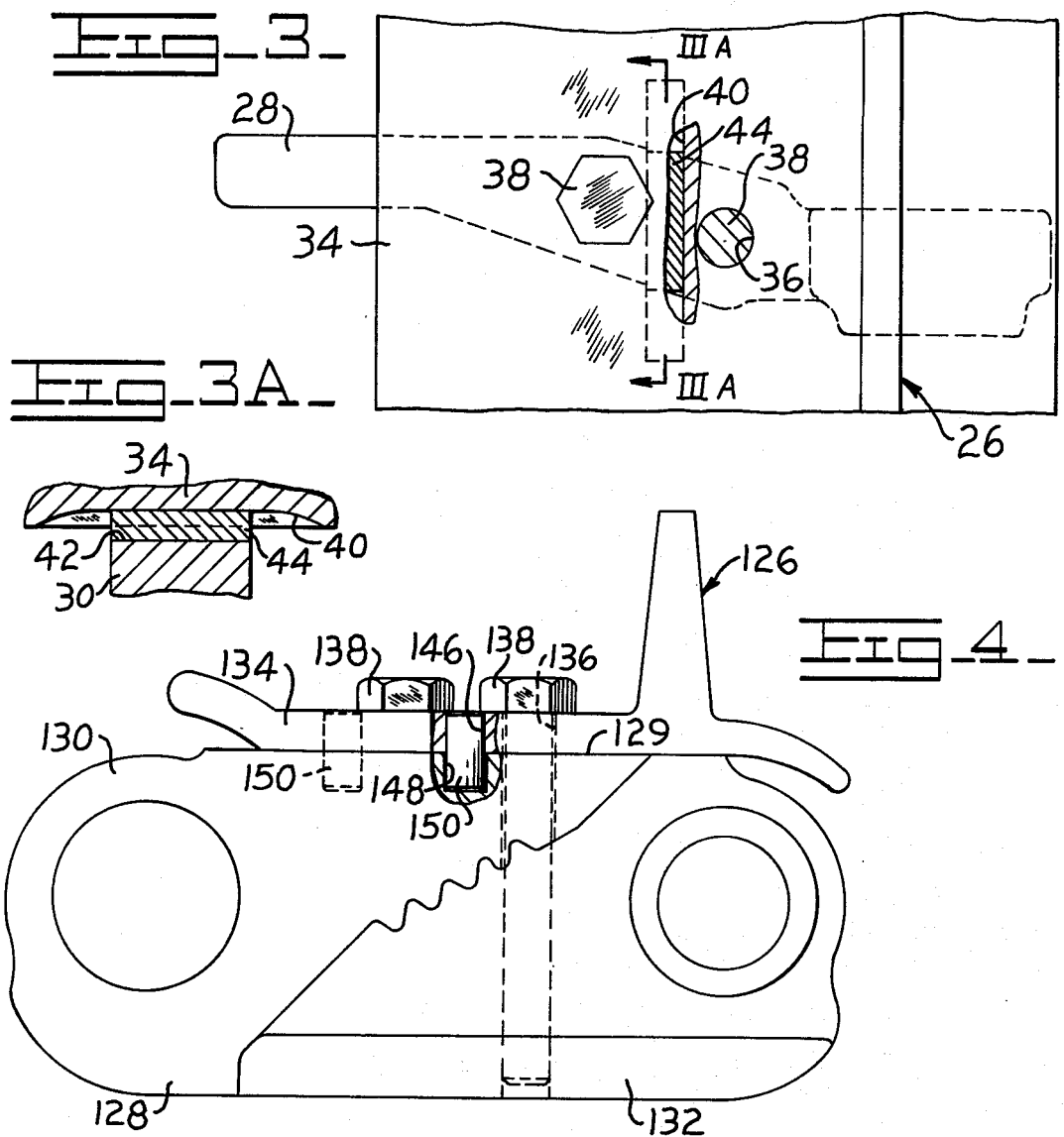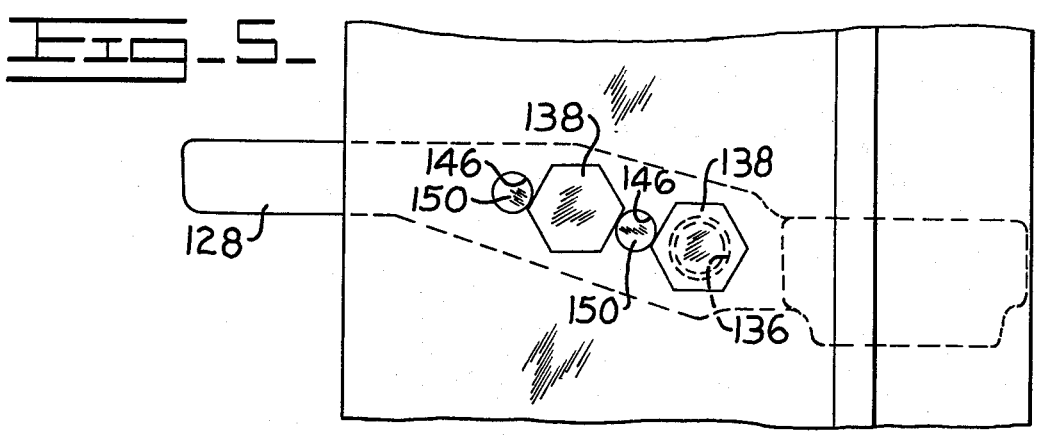

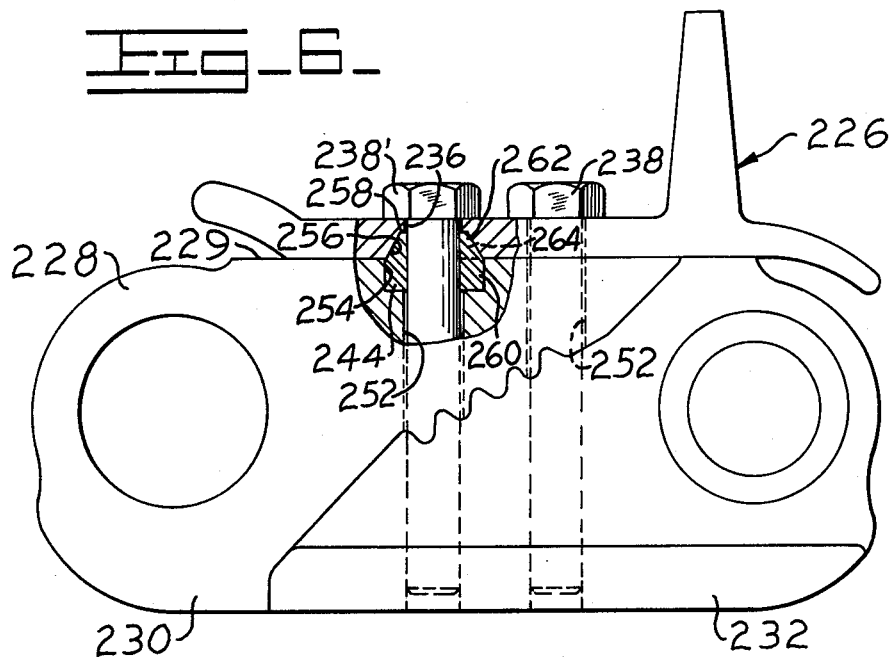
Fig_6_
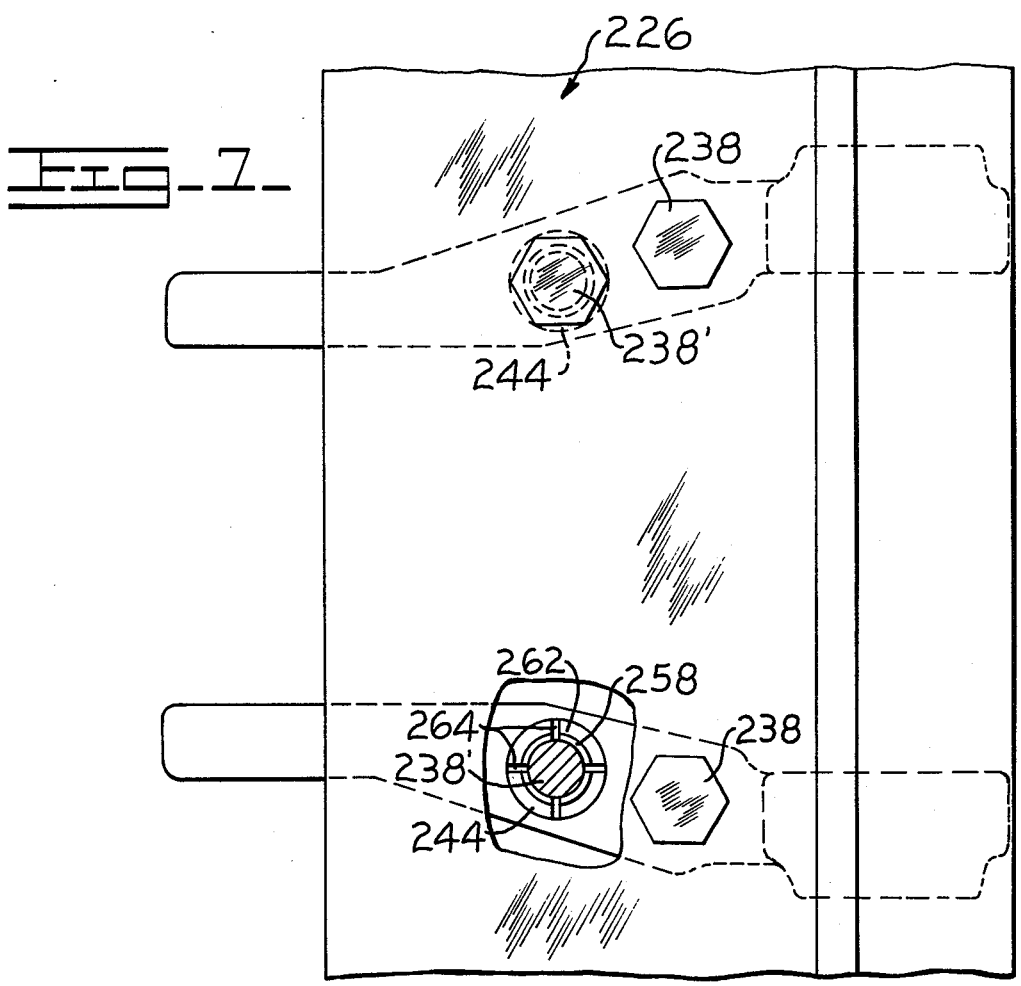
Fig_7_

TRACK SHOE AND BOLT RETENTION ARRANGEMENT

This is a continuation of application Ser. No. 601,869 filed Aug. 4, 1975, abandoned.

BACKGROUND OF THE INVENTION

1. Field of the Invention

This invention relates to track-type vehicles and, more particularly, to an improved keying arrangement between a track shoe and a track link to reduce or eliminate shear stress on the bolts between said shoe and said link.

2. Description of the Prior Art

In track-type vehicles, there is a particular problem in retaining the track shoe of the track in proper position on the track link. The method most commonly in use is to bolt the track shoe to the track link, but often there are loads of such magnitude exerted against the track shoe that the shoe is moved relative to the link. This movement can cause the bolt to loosen or to break as a result of the shear loads placed on the bolt. The bolt may also bend causing high stress levels on the threads which also can lead to failure of the bolt and stripping of the threads in the link. Movement of the shoe relative to the link and bending of the bolts is especially a problem on the two-piece master link in the track because of the larger clearance holes that are required to provide for the stack-up of tolerances through the piece parts and the assembly.

U.S. Pat. No. 2,823,080 to E. C. Bauer, Jr. attempted to solve part of the problem by providing a pair of spaced apart retainers projecting downwardly from the grouser plate of the track shoe, which retainers engage with an enlarged tie bar extending between the respective track links. Although this construction helped to eliminate rotation of the track shoe relative to the links, it did not solve the problem of eliminating shear stresses on the bolts. In addition, the construction requires modifications of the grouser plate of the track shoe and of the link and requires that the two be used together to accomplish the desired result. It was also necessary to accurately position the abutments on the grouser plate relative to the openings for the bolts to the links since, in order for the restraint on rotation provided between the abutments and the tie bar to be effective, they must fit tightly together to eliminate looseness or play between the track shoe and the link.

Another structure directed to the problem provided for slots formed in the top surfaces of the adjacent links and struck down portions or cast portions formed on the under surface of the grouser plate of the track shoe, which struck down portions were intended to nest in and align with the slots in the links so as to prevent the track shoes from rotating or shifting relative to the links. This system had the same shortcomings as the Bauer patent in that it was necessary to provide very accurate matching between the struck down portions and the walls of the slots so as to eliminate play between the track shoe and the links. The system also required modifications particularly of the track shoe, i.e. by providing the struck down portions, which made the track shoe usable only with links that have mating slots.

SUMMARY OF THE INVENTION

The disadvantages of the prior art have been overcome by providing a key arrangement between the track shoe and the link so as to substantially reduce or eliminate shifting of the track shoe relative to the link. This is particularly important on the master link of the track. It is contemplated that transverse aligned keyways be formed in the bottom surface of the grouser plate of the track shoe and in the outer surface of the link of the track. An appropriate key is seated in the aligned keyways to reduce or eliminate relative movement between the track shoe and the link. The key will receive the shear loads.

In a modified form of our invention, openings are formed through the grouser plate of the track shoe and into the outer surface of the link of the track into which openings pins or keys are driven. The pins or keys take up the shear loads between the link and the track shoe.

In another modified form of our invention, a concentric opening is formed around one of the bolt holes in the outer surface of the link and a truncated conical opening is formed around the mating bolt hole in the grouser plate of the track shoe. A key or cam bushing is provided with a slotted and truncated conical portion which conical portion is seated in the conical opening in the track shoe with the rest of the key in the concentric opening in the link so that the bolt, when drawn up between the link and the track shoe, will wedge the key in the openings. The key will receive the shear loads between the track shoe and the link thereby eliminating shear loads on the bolts.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a track-type tractor showing the master link and several adjacent links of the track;

FIG. 2 is an enlarged elevational view of one form of our invention showing a master link with a track shoe attached thereto and with a portion through a key and keyway broken away and in section;

FIG. 3 is a partial plane view of the track shoe and link of FIG. 2 with a portion through the track shoe and key broken away and in section;

FIG. 3A is a cross-sectional view of FIG. 3 taken along the line 3A—3A thereof;

FIG. 4 is an enlarged elevational view of a modified form of our invention with a portion through the key and keyway broken away and in section;

FIG. 5 is a partial plane view of the track shoe and link of FIG. 4, showing the relative locations of the dowels;

FIG. 6 is a further modified form of our invention showing an elevational view of a master link and track shoe with a portion broken away and in section showing the improved key and keyway arrangement; and FIG. 7 is a plane view of the track shoe and a pair of links of FIG. 6 with a section through the key broken away and showing the bolt in section.

DESCRIPTION OF THE PREFERRED EMBODIMENT

Referring to FIG. 1, a track-type vehicle, in this case a track-type tractor, 10 has a frame 12 for supporting an engine 14, an operator station 16, a sprocket 18 for driving a track 20 over the carrier rolls 22 and around the idler roll 23. The track 20 is comprised of pivotally connected together links 24 supporting track shoes 26. A master link 28 is provided for connecting the ends of the last pair of links together to form the track.

FIGS. 2, 3 and 3A show the master link 28 as comprising two overlapping master link parts 30 and 32 which mate and interlock along a juncture line 33. The construction and operation of a typical master link of the type herein referred to, is shown in U.S. Pat. No. 3,427,079, issued Feb. 11, 1969 and assigned to the common assignee of the present application. The details of the construction of the master link are adequately and completely disclosed in said patent and will not be repeated here. The track shoe 26 has a grouser plate 34 with two openings 36 through each side portion thereof. Bolts 38 pass through said openings 36 into each link 24 or into the master link 28. In the case of the master link 28, the bolts 38 have threads at the lower ends thereof which threads are threaded into the lower master link part 32 for securing the track shoe 26 to the link 28. The openings 36 in the track shoe 26 and the openings 39 in the upper master link part 30 are larger than the diameter of the bolt 38 so as to allow for the tolerance build-up in the track.

Routed or formed in the under surface of the grouser plate 34 is a keyway 40 which, as is shown in FIG. 3A, is tapered in from the ends of the keyway to a uniform depth throughout the major portion thereof. Aligned with the keyway 40 and formed in the outer transverse surface 29 of the upper link part 30 of the master link 28 is a matching keyway 42. An elongate, rectangular in cross section key 44 is provided and is wedged into either keyway 40 or keyway 42. The track shoe 26 is then positioned with the grouser plate 34 engaging with the upper half 30 of the link 28, the key 44, wedged in, for instance, keyway 40 is aligned with keyway 42 and is forced into seated position therein. As can be seen in FIG. 3A, the shape of the ends of the keyway 40 are such as to prevent the key 44 from working out of the keyway. The key 44 is seated into the keyways 40 and 42 so as to provide a relatively rigid connection between the track shoe and the link. The bolts 38 are dropped in the openings 36 in the grouser plate of the track shoe and into openings 39 in the upper link 30 whereupon, when the two link parts 30 and 32 of the link 28 are properly positioned relative to each other, the bolts 38 are threaded into the lower link part 32 and are drawn up tight. With the bolts tightened onto the track shoe, the master link 28 is assembled for holding the track on the track-type vehicle and the key 44 will securely lock the track shoe 26 relative to the master link 28 so that the track shoe cannot shift relative to the link. In this way, shear forces along the parting line between the track shoe and the link are taken by the key 44 whereby twisting or shearing of the bolts 38 is substantially eliminated.

In the modified form of our invention, shown in FIGS. 4 and 5, the track shoe 126 is shown positioned on the master link 128 by means of the bolts 138. The grouser plate 134 of the track shoe 126 has a pair of openings 146 formed or bored therethrough, in one case between the openings 136 for the bolts 138 and in the other case immediately beside the opening 136 for the bolt 138 nearer to the back end of the grouser plate. The center of the openings 136 for the bolts 138 and the centers of the openings 146, lie on a common axis in the thicker angled intermediate portion of the outer surface 129 of the link 128. The outer surface of the link 128 has a pair of openings 148 aligned with the openings 146 in the grouser plate 134 of the track shoe 126. As can be seen in the broken away section of FIG. 4, the openings 148 are slightly larger in diameter than the openings 146. For illustration purposes, this increase in size is accentuated, the actual differences between the diameters being very little.

Keys or pins 150 are driven into the openings 146 in the plate 134 of the shoe 126. The diameters of the keys or pins 150 are such that the fit between the pin 150 and the opening 146 is quite tight. With the pins 150 wedged in the openings 146 in grouser plate 134, the track shoe 126 is ready for assembly with the master link 128. The pins 150 are aligned with and forced into the openings 148 in the link 128. The respective link parts 130 and 132 of the master link 128 are assembled and the bolts 138 are dropped through the openings 136 in the track shoe 126 and are threaded into the lower link part 132. The bolts are drawn up tight to positively lock the track shoe 126 to the master link 128 and at the same time to lock the two halves of the master link together. The pins 150 will serve as retainers for the track shoe 126 on the master link 128, that is, the track shoe will not be permitted to move or shift relative to the link 128 with the pins 150 taking up all of the shear forces between the track shoe and the link. The bolts 138 have none or very little shear forces along the parting line between the track shoe and the link and, therefore, the likelihood of shearing the bolts or damaging the threads in the link parts or of bending the bolts with the possibility of rupture is substantially eliminated.

The modification of our invention shown in FIGS. 6 and 7 shows a master link 228 comprised of master link parts 230 and 232 to which the track shoe 226 is secured by means of bolts 238, 238'. The bolt 238' passes through an opening 236 in the grouser plate and through opening 252 in the master link part 230. The outer surface 229 of the link 228 is concentrically bored around the opening 252 to form a cylindrical recess 254. The bottom face of the grouser plate is concentrically bored around the opening 236 in a truncated conical configuration to form a conical recess 256. That is, the wall of the recess or bore 256 in the grouser plate converges toward the opening 236 in the grouser plate and is truncated at 258. A key or cam bushing 244 is provided and has a cylindrical lower portion 260 and a truncated conically tapered upper portion 262. The key or cam bushing 244 has the truncated upper portion slotted longitudinally from the truncated end 258 as at 264. The slots 264 extend down to about the base of the sloping walls of the conical portion 262.

With the track shoe 226 removed, a key or cam bushing 244 is wedged down into the cylindrical recess or bore 254 in the outer surface 229 of the link 228. The track shoe 226 is aligned with the link with the tapered or conical recess 256 surrounding the opening 236 in the grouser plate, aligned with the truncated conical portion 262 of the key or cam bushing 244. The bolts 238, 238' are inserted through the openings 236 in the grouser plate of the track shoe 226 and are threaded into the master link part 232 when the two parts 230, 232 of the master link are properly positioned. The bolts 238 are drawn up tight which, in the case of bolt 238', wedges the conical portion 262 of the key into the truncated recess 256 of the shoe which will close the open ends of the slots 264. This will have a tendency to properly align the key or cam bushing 244 relative to the track shoe and to wedge the track shoe onto said key or cam bushing. In this way, all shear loads between the shoe and the link will be carried by the key or cam bushing 244 and the bolts 238, 238' will not be subjected to any appreciable shear forces. The key or cam bushing 244 also will serve to position the track shoe 226 relative to the master link 228 whereupon shifting of the track shoe relative to the link will be prevented.

Our invention encompasses providing aligned recesses in the mating surfaces of a link and shoe with key means seated in said recesses to absorb shear and twisting forces between said link and shoe. Since no protruding parts are provided on the link or on the shoe, it is possible to use standard shoes with our specially designed links or standard links with our specially designed shoes.

Although all three embodiments of our invention have been shown and described with respect to the use of a key in a keyway in the master link of a track, it is to be understood that track shoes may be keyed to regular links to accomplish the desired results set forth with respect to the master link, all without departing from the spirit of our invention.

We claim:

1. In a master link having an outer surface for receiving a track shoe, said link being split into two separable parts along a generally diagonal plane relative to the length of said link, said outer surface of said link having a slot formed therein, said track shoe having a slot in the bottom surface thereof aligned with said slot in said link, said slot in said link and said slot in said track shoe being rectangular in cross section, rectangularly-shaped key means seated in said aligned slots for bridging the parting line between said link and said track shoe, a pair of aligned openings in said track shoe and said link for receiving a pair of bolts for securing said track shoe to said link whereby tightening said bolts seats said key means in said aligned slots so that shear stress between the shoe and the link is taken by the key means.

2. In a master link as claimed in claim 1 wherein said slot in said link is an elongate slot lying perpendicular to the longitudinal center line of said link, said slot in said track shoe is an elongate slot lying parallel to the longitudinal center line of said track shoe, and said key means is an elongate member seated in said aligned elongate slots.

3. In a master link having an outer surface for receiving a track shoe, said link being split into two separable parts along a generally diagonal plane relative to the length of said link, said outer surface of said link having at least a pair of bores formed therein along an axis perpendicular to the plane of the outer surface of said link, said track shoe having at least a pair of bores in the bottom surface thereof aligned with said pair of bores in said link, the diameter of each of said bores in said link is slightly larger than the diameter of each of the bores in said shoe, key means seated in each of said pair of aligned bores for bridging the parting line between said link and said track shoe, each of said key means is a pin of a diameter slightly larger than the diameter of the bore in said shoe whereby the pin is force fit into said bore in said shoe and extends into said bore in said link, a pair of aligned openings in said track shoe and said link for receiving a pair of bolts for securing said track shoe to said link whereby tightening said bolts seats said key means in said aligned bores so that shear stress between the shoe and the link is taken by the key means.

4. In a master link having an outer surface for receiving a track shoe, said link being split into two separable parts along a generally diagonal plane relative to the length of said link, said outer surface of said link having at least a pair of bores formed therein along an axis perpendicular to the plane of the outer surface of said link, said track shoe having at least a pair of bores in the bottom surface thereof aligned with said pair of bores in said link, at least one of said bores in said link and at least one of said bores in said track shoe are concentrically disposed with respect to one of the aligned openings in said link and said shoe, key means seated in each of said pair of aligned bores for bridging the parting line between said link and said track shoe, said key means is a cam bushing seated in said last-named bores in said link and track shoe and surrounding one of said bolts and a pair of aligned openings in said track shoe and said link for receiving a pair of bolts for securing said track shoe to said link whereby tightening said bolts seats said key means in said aligned bores so that shear stress between the shoe and the link is taken by the key means.

5. In a master link as claimed in claim 4 wherein said bore in said last-named track shoe is shaped like a truncated cone and the upper part of said cam bushing is a truncated cone and has slots formed in the truncated portion thereof, said cam bushing seating in said last-named bores with said bolt passing therethrough, said bolt clamping said cam bushing in said bore, and said cam bushing being adapted to receive shear loads between said link and said track shoe.

6. In a track-type vehicle having a track with a plurality of links pivotally connected together, a master link joining the two endmost links and having a substantially planar upwardly facing surface, a track shoe having a grouser plate with a substantially planar surface bolted to said master link, aligned slots formed in the mating planar surface of said master link and said grouser plate of the aligned track shoe, said slots extend transverse to a direction of movement of said track, an elongate key seated in said elongate slots and bridging the parting line between said planar surfaces of said grouser plate and said link, bolts passing through openings in said grouser plate and being threaded into openings in said link whereby tightening said bolts seats said elongate key in said aligned elongate slots to substantially eliminate shear on said bolts.

7. In a master link having an outer surface for receiving a track shoe, said link being split into two separable parts along a generally diagonal plane relative to the length of said link, said outer surface of said link having at least two blind bores formed therein along an axis perpendicular to the plane of the outer surface of said link, said track shoe having at least two bores in the bottom surface thereof aligned with said bores in said link, key means seated in each of said aligned bores for bridging the parting line between said link and said track shoe, said key means being retained in position in said aligned bores by being force fit into one of said bores in said link and said shoe, a pair of aligned openings in said track shoe and said link for receiving a pair of bolts for securing said track shoe to said link whereby tightening said bolts seats said key means in said aligned bores so that shear stress between the shoe and the link is taken by the key means.

8. In a track-type vehicle having a track with a plurality of links pivotally connected together, a master link joining the two endmost links and having a plurality of openings therein, a track shoe having a grouser plate with a plurality of openings aligned with the openings in said master link, a bore formed in said master link and said grouser plate concentric with the axis of one of said aligned openings therein, a cam bushing seated in said bore and bridging the parting line between said grouser plate and said link, a bolt passing through said cam bushing and being threaded into a threaded portion of the opening in said link, additional bolts passing through said openings in said grouser plate and being threaded into threaded portions of the openings in said link whereby tightening said first-named bolt seats said cam bushing in said aligned bore to substantially eliminate shear on the bolts.

9. In a track-type vehicle as claimed in claim 8 wherein the bore in said grouser plate is a truncated cone in shape, the upper portion of said cam bushing is a truncated cone of slightly larger dimension than said truncated bore, said truncated cone of the bushing nesting in the truncated bore of the plate and being wedged therein by tightening of said bolt.

10. In a track-type vehicle as claimed in claim 9 wherein said truncated cone has longitudinal slots formed therein whereby tightening said bolt wedges the walls of said bore in said plate onto said cone and depresses the side walls of said slots to eliminate looseness between said plate and said link along the parting line therebetween.

11. In a link having an outer surface for receiving a track shoe, said outer surface of said link having an elongate slot formed therein, said track shoe having an elongate slot in the bottom surface thereof aligned with said slot in said link, said slots in said link and said shoe being rectangular in cross section, a rectangularly-shaped key means seated in said aligned slots for bridging the parting line between said link and said track shoe, a pair of aligned openings in said track shoe and said link for receiving a pair of bolts for securing said track shoe to said link whereby tightening said bolts seats said key means in said aligned slots so that shear stress between the shoe and the link is taken by the key means.

12. In a track-type vehicle having a track with a plurality of links pivotally connected together, a master link member joining the two endmost links and having an outwardly facing surface, a track shoe having a grouser plate member with a surface bolted to said facing surface of the master link, an elongate slot formed in the mating surface of one of said master link member and said grouser plate member of the aligned track shoe, said slot being substantially rectangular in cross section and extending transverse to the direction of movement of said track, an elongate substantially rectangularly-shaped key formed integral with the other of said master link member and said grouser plate member and bridging the parting line between said grouser plate member and said link member and seating in said elongate slot, bolts passing through openings in said grouser plate and being threaded into openings in said link whereby tightening said bolts seats said elongate key in said aligned elongate slot to substantially eliminate shear on said bolts.

* * * * *